United States Patent
Xu et al.

(10) Patent No.: US 9,790,375 B2
(45) Date of Patent: Oct. 17, 2017

(54) PROTECTIVE COATING FOR A SUBSTRATE

(71) Applicants: Zhiyue Xu, Cypress, TX (US); Deepak Kumar, Houston, TX (US)

(72) Inventors: Zhiyue Xu, Cypress, TX (US); Deepak Kumar, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 477 days.

(21) Appl. No.: 14/047,695

(22) Filed: Oct. 7, 2013

(65) Prior Publication Data

US 2015/0096743 A1 Apr. 9, 2015

(51) Int. Cl.
| | | |
|---|---|---|
| *E21B 17/00* | (2006.01) | |
| *E21B 33/13* | (2006.01) | |
| *C09D 5/08* | (2006.01) | |
| *E21B 34/14* | (2006.01) | |

(52) U.S. Cl.
CPC .............. *C09D 5/08* (2013.01); *C09D 5/084* (2013.01); *E21B 34/14* (2013.01); *Y10T 428/31678* (2015.04)

(58) Field of Classification Search
CPC .......... E21B 33/12; E21B 29/00; E21B 17/00; E21B 23/00; E21B 34/06; E21B 34/063; B22F 1/025; B22F 7/02; B22F 1/02; C23C 14/06; C23C 28/42; C23C 30/005; C09D 5/08

See application file for complete search history.

(56) References Cited

U.S. PATENT DOCUMENTS

| | | | | |
|---|---|---|---|---|
| 5,607,017 | A | * | 3/1997 | Owens .................... E21B 33/12 166/288 |
| 6,719,074 | B2 | * | 4/2004 | Tsuda .................. E21B 10/5735 175/428 |
| 8,851,172 | B1 | * | 10/2014 | Dudzinski ............. E21B 33/138 166/193 |
| 2007/0299510 | A1 | * | 12/2007 | Venkatraman ........ A61F 2/0077 623/1.44 |
| 2010/0081000 | A1 | * | 4/2010 | Vetter ................... C23C 14/022 428/448 |
| 2010/0294510 | A1 | * | 11/2010 | Holmes ................... E21B 41/00 166/376 |
| 2010/0320005 | A1 | | 12/2010 | Burhan et al. |

(Continued)

OTHER PUBLICATIONS

C. Larsson, M Oden, "Hardness profile measurements in functionally graded WC-Co composites", Materials Science and Engineering A, vol. 382, Issue 1-2, p.n. 141-149.

(Continued)

*Primary Examiner* — Daniel P Stephenson
(74) *Attorney, Agent, or Firm* — Cantor Colburn LLP

(57) ABSTRACT

A coating having a gradient composite structure, applied to a substrate, which may be a disposable tool. The gradient composite comprises a bonding component and an erosion and/or corrosion resistant component. When applied to a disposable tool, such as a ball and seat assembly in a downhole environment, the coating enhances the performance of disintegrable materials used in such tools. The coating may be configured to expire at the end of a selected duration, allowing the underlying material to disintegrate.

24 Claims, 3 Drawing Sheets

(56) References Cited

U.S. PATENT DOCUMENTS

| | | | |
|---|---|---|---|
| 2011/0135530 A1* | 6/2011 | Xu | B22F 1/02 419/13 |
| 2011/0136707 A1* | 6/2011 | Xu | C22C 1/04 507/270 |
| 2011/0220415 A1 | 9/2011 | Jin et al. | |
| 2012/0006561 A1* | 1/2012 | Johnson | E21B 23/04 166/373 |
| 2012/0006562 A1* | 1/2012 | Speer | E21B 23/04 166/373 |
| 2012/0080189 A1* | 4/2012 | Marya | C09K 8/805 166/279 |
| 2012/0103595 A1 | 5/2012 | Hall et al. | |
| 2012/0118583 A1* | 5/2012 | Johnson | E21B 29/02 166/376 |
| 2012/0273229 A1* | 11/2012 | Xu | B22F 7/06 166/376 |
| 2012/0318513 A1* | 12/2012 | Mazyar | C23C 18/1689 166/304 |
| 2013/0000985 A1* | 1/2013 | Agrawal | E21B 41/00 175/87 |
| 2013/0032357 A1* | 2/2013 | Mazyar | E21B 41/00 166/376 |
| 2013/0133951 A1 | 5/2013 | Olsen | |
| 2013/0252022 A1 | 9/2013 | Bullard et al. | |
| 2013/0327540 A1* | 12/2013 | Hamid | E21B 33/12 166/376 |
| 2014/0190705 A1* | 7/2014 | Fripp | E21B 33/12 166/376 |
| 2015/0096743 A1* | 4/2015 | Xu | C09D 5/08 166/192 |
| 2015/0285030 A1* | 10/2015 | Tolman | E21B 43/12 166/373 |

OTHER PUBLICATIONS

C. Larsson, M Oden, "X-ray diffraction determination of residual stresses in functionally graded WC-Co Composites", International Journal of Refractory Metals and Hard Materials, vol. 22, Issue 4-5, p.n. 177-184.

International Search Report and Writtion Opinion, International Application No. PCT/US2014/053775, dated Dec. 12, 2014, Korean Intellectual Property Office, International Search report 4 pages, Written Opinion 7 pages.

Xu Wang, Kyu Sup Hwang, Mark Kroopman, Z. Zak Fang, Liehua Zhang, "Mechanical properties and wear resistance of functionally graded WC-Co" International Journal of Refractory Metals and Hard Materials, vol. 36, p.n. 46-51.

\* cited by examiner

PROTECTIVE COATING FOR A SUBSTRATE

BACKGROUND

Seat assemblies such as, for example, ball seats, are well known in a variety of industries. In downhole applications, such as in hydraulic fracturing operation, balls or plugs and seats for the same are commonly used to control the flow of fluids and actuate downhole devices. While such systems work sufficiently for their desired purposes, these assemblies can interfere with subsequent operations, activities, production, etc., and physical removal of the seats, e.g., by fishing or intervention, can be difficult, costly, and time consuming. Therefore, the industry is receptive to advancements in ball or plug seat assembly technology, particularly in designs that enable the seat and the various components thereof to be selectively removed in order to facilitate subsequent operations.

SUMMARY

Disclosed herein is a coating for a transitory substrate. The coating is a composite structure with a bonding component and an erosion and/or corrosion resistant component. A proximal layer of the coating contains a greater amount of the bonding component in comparison with a distal layer.

Also disclosed herein is a disposable tool including a substrate formed from a disintegrable material. The coating has a gradient composite structure, formed of a bonding component and an erosion and/or corrosion resistant component, with a layer of the coating in contact with the substrate having a greater amount of the bonding component than a distal layer.

Also disclosed herein is an apparatus for restricting flow through a well conduit. The apparatus comprises a housing with a seat and a plug member. The housing and/or the plug member is formed from a disintegrable material with a protective coating applied thereon.

Also disclosed herein is a seat assembly located in a well bore. The seat assembly is formed with a substrate, at least partially from a disintegrable material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to a ball seat apparatus for use in well operations, whereas the advantages of the present disclosure as applied in a related field would be apparent to one having ordinary skill in the art and are considered to be within the scope of the present invention.

In one embodiment, the present disclosure provides a tool assembly having a substrate that is formed at least partially from a disintegrable material. The tool assembly may be, for example, a seat assembly disposed in a well bore. The seat assembly includes a seat element configured to receive a plug element, such as a frac ball or the like, whereupon the seat element and the plug element restrict the flow of fluids through the well bore when the plug element is landed thereon. The advantages of having a tool assembly or an element thereof, such as a seat element, comprised of a disintegrable surface are discussed in more detail below. In short, the use of a disintegrable material enables a controllable and predictable disposal. By using a disintegrable material, as opposed to a material that can be dissolved in a particular fluid, the tool assembly or tool element may be disposed of in a short amount of time with accurate results. Some disintegrable materials may have an element embedded therein that can be triggered to activate an accelerated disposal of the structure.

Figure 1:
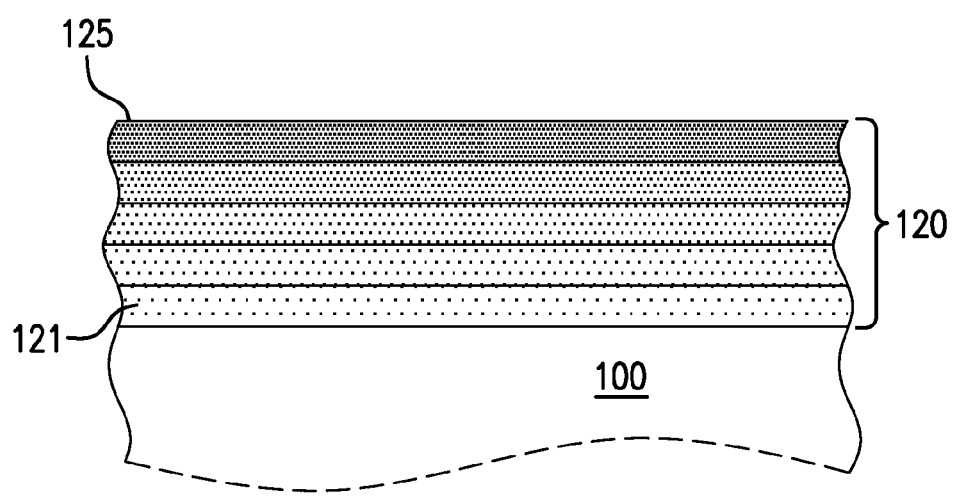
FIG. 1 is a sectioned side view depicting a coating on a substrate, according to one embodiment.

FIG. 1 is an illustration of one embodiment of a protective coating disclosed herein. The coating 120 is applied to a substrate 100. The coating 120 comprises a gradient composite structure. As shown, the coating comprises a proximal layer 121, which lies against the substrate, and a distal layer 125. In the illustrated example, it will be appreciated that the coating comprises a plurality of additional intervening layers between the proximal layer 121 and the distal layer 125. Each layer of the gradient composite structure contains increasing amounts of one component and decreasing amounts of the other component when viewed in one direction. The layers may be bonded, fused, or otherwise attached to each other and to the substrate.

In some examples of the present disclosure, the substrate 100 is a disposable tool. The substrate may be a transitory substrate, one that is configured to be dissolved, decomposed, disintegrated or deformed in order to dispose of the tool when its purpose has been fulfilled. In some examples, the transitory substrate may be formed of a disintegrable material, so as to eliminate any necessary intervention to dispose of the tool. The disintegration of the substrate 100 may be accomplished, for example, by adding a chemical to a process fluid, by raising the pressure and/or temperature of the process fluid, or by prolonged exposure to the environment in which the tool is used. For example, the substrate may be formed of a material that will be substantially dissolved or disintegrated within a particular timeframe, once the substrate is exposed to a particular process fluid. In some examples, the substrate itself may comprise an outer layer covering a further underlying structure or applied to an underlying structure or tool. The substrate may, for example, form tool used in a downhole environment, including a plug, a plug seat, disk, dart, sleeve, tubular section, or the like.

The coating 120 of the present disclosure may be a coating, a film, a deposit, a cladding, or any other layer applied to an underlying structure. The coating 120 of the present disclosure can be applied to a tool, or to an exposed feature of a tool, to protect the tool from erosion and/or corrosion until the completion of a particular operation. For example, many disintegrable materials that are presently available do not perform as well as other alternative materials used for disposable tools, such as cast iron. The coating 120 described herein can be formed to exhibit superior qualities of hardness, toughness, and chemical resistance towards the process fluid, thereby protecting the tool from erosion and corrosion and enhancing the performance and durability of the disintegrable material. The coatings of the present disclosure may inhibit volume loss due to erosion by as much as a factor of 15 when compared to cast iron.

The coating 120 may exhibit other advantageous qualities. The gradient composite structure of the coating 120 may be configured to predictably fail or dissolve within a particular timeframe when used in a chosen environment. By selecting materials, gradient compositions and thickness, the coating may be configured to fail, or dissolve in a selected timeframe. Where the coating is applied to a transitory substrate, the substrate may be configured to quickly disintegrate upon the expiration (failure or dissolution) of the coating. Thus, the present invention enables the selective use of coatings to enhance the performance of a particular tool and to more effectively dispose of the tool if desired. The coating may be configured to endure for a selected duration by changing the composition and/or thickness thereof.

In some embodiments the coating 120 comprises two primary components, namely, a bonding component and an erosion and/or corrosion resistant component. Each of the bonding component and erosion and/or corrosion resistant components may further comprise multiple ingredients. For example, the bonding component is selected to bring a quality of toughness to the coating; i.e., the bonding component enables the coating to resiliently attach to the substrate as well as form a resilient microstructure, forming a matrix for holding the erosion and/or corrosion resistant component. Examples of materials that may be appropriate for use in the bonding component include cobalt, chromium, copper, nickel, iron, and the like, including alloys thereof. These materials are typically noted for ductility and ability to form strong metallurgical bonds with disintegrable materials used as substrate for disintegrable tools. Other materials that may be useful as ingredients within the bonding component will be apparent to one having ordinary skill in the art and are within the scope of the present disclosure.

As described above, the erosion and/or corrosion-resistant component is chosen to enhance the hardness, toughness, and/or chemical resistance of the coating. This is intended to protect the substrate from erosion and/or corrosion that may otherwise result from exposure to the environment in which the substrate is placed. The erosion and/or corrosion resistant component may further be chosen to complement the material or ingredients chosen for the bonding component. Examples of materials that may be appropriate for use in the erosion and/or corrosion resistant component of the composite structure include carbides, nitrides, oxides, ceramics, and intermetallics. More specific examples include tungsten carbide, silicon carbide, chromium carbide, titanium carbide, zirconium carbide, silicon oxide, aluminum oxide and the like. Other materials that may be useful as ingredients within the erosion and/or corrosion resistant component will be apparent to one having ordinary skill in the art and are within the scope of the present disclosure.

In one embodiment the components of the composite structure are present in increasing or decreasing amounts when viewed from the proximal or distal layers of the structure. For example, as shown in FIG. 1, the proximal layer contains a greater concentration of the bonding component when compared to the distal layer. Likewise, the erosion and/or corrosion resistant component may exist in increasing amounts among successive layers, when viewed from the proximal layer.

The coating 120 may be applied to the substrate 100 using any one of a number of suitable methods. In many cases, the coating will be applied as a series of thin layers with the component materials being supplied in a powder or solid block form. Suitable methods include, for example, physical vapor deposition, chemical vapor deposition, plasma-enhanced chemical vapor deposition, thermal spray, cold spray, or laser deposition methods. In some embodiments, the material forming the substrate may require that the procedure for applying the coating be performed at or below a particular temperature, which may restrict the number of methods available. Whether accomplished using exposure to high-temperature, high-pressure, or by another method, the composite coating forms a resilient microstructure and a sufficient bond with the underlying substrate.

Figure 2:
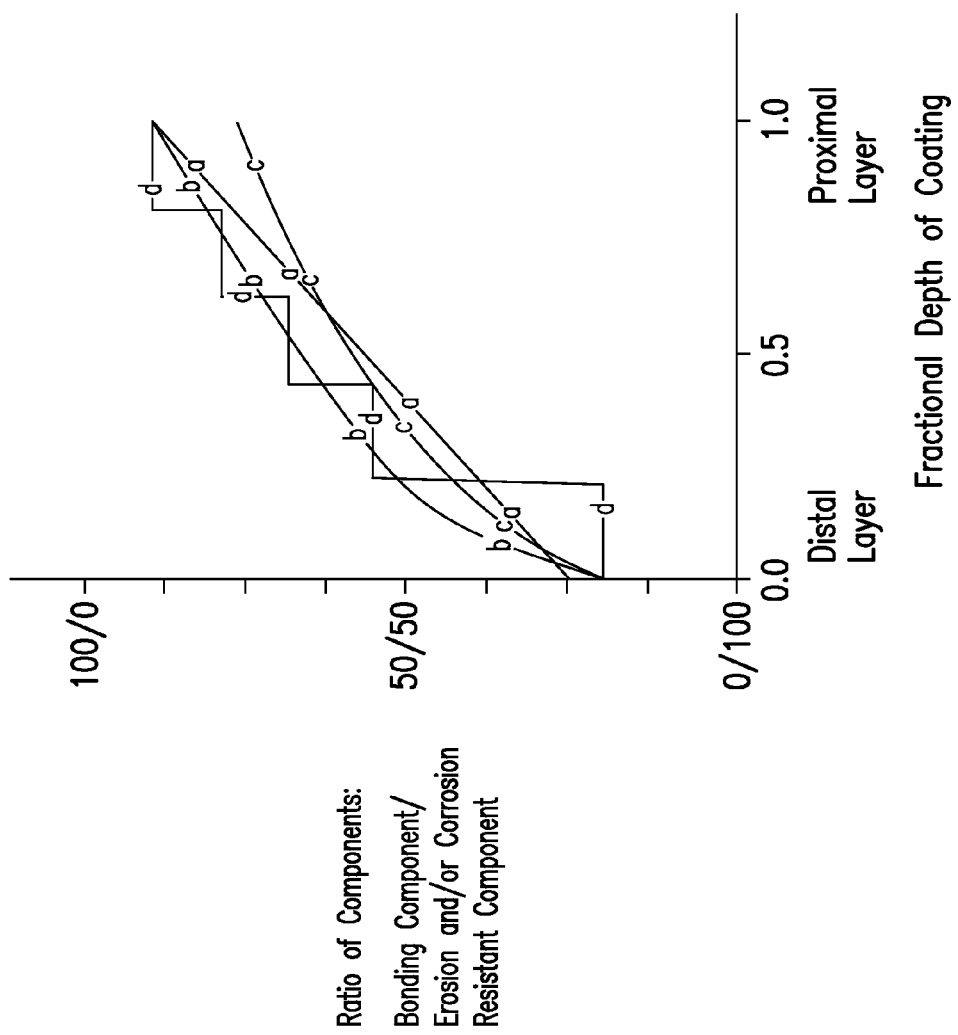
FIG. 2 is a graph depicting various examples of a gradient composite structure according to another embodiment.

FIG. 2 displays a chart showing various examples of the composition of the gradient composite structure of the present disclosure. The horizontal axis corresponds to the fractional depth of the coating, with 1.0 representing proximal layer, or the point at which the coating contacts the substrate, and with 0.0 representing the outer extent of the distal layer. The vertical axis of the chart corresponds to the ratio of the bonding component to the erosion and/or corrosion resistant component, with 70/30 representing a composition of 70 parts bonding component to 30 parts erosion and/or corrosion resistant component, for example.

In FIG. 2, example 'a' represents a coating in which the composition at the proximal layer is a ratio of approximately 88 parts bonding component to 12 parts erosion and/or corrosion resistant component. The composition of the composite structure in example 'a' evolves continuously on an even gradient to the distal layer, where the composition is approximately 25 parts bonding component and 75 parts erosion and/or corrosion resistant component. Example 'b' of FIG. 2 depicts a similar composition in which the concentration of bonding component increases more rapidly near the extent of the distal layer. Example 'c' illustrates another case in which a ratio of 20 to 80 is chosen at the distal layer, and a ratio of 70/30 is chosen at the proximal layer. Finally, example d illustrates a case in which the composite structure comprises five distinct layers of varying ratios, roughly following the line of example 'b'.

FIG. 2 does is not intended to convey each of the many ways in which the gradient may vary. A variety of ratios may be chosen for different applications, including those in which the layers of the composite structure are not as distinct as those shown in example 'd'. Because of the small dimensions of many embodiments, the transition zones from one layer to another in the microstructure of the coating will vary in depth and consistency. Further, any ratios may be chosen for the distal and proximal layers, with the proximal layer typically containing a greater concentration of the bonding component. For example, in various embodiments, the ratio of bonding component to erosion and/or corrosion resistant component was chosen to be anywhere from about 90/10 to about 50/50. This ratio may be selected, for example, to achieve a failure or dissolution of the coating after a selected duration or within a selected timeframe.

The thickness of the coating, in addition to the composition thereof, is a significant factor in determining the properties of the coating and the duration after which the coating will expire. In some examples, the coating thickness was selected to be within a range of from about 0.0005 inches to about 0.1 inches. Other examples were chosen to have a thickness of about 0.010 inches, about 0.020 inches, and about 0.060 inches, respectively. Larger coating thicknesses are possible, depending on the materials and the application. Thicker coatings, however may lead to cracking or other defects that can lead to premature failure. In general, the coating should be at a thickness that can be consistently applied and that will withstand the environment of the chosen application, though exceptions, such as an intentional variation in thickness, are also within the scope of this disclosure.

Another important aspect of material selection for the bonding and erosion and/or corrosion resistant components is the coefficient of thermal expansion. At least the bonding component, if not the composite structure in its entirety, should have a coefficient of thermal expansion that is substantially similar to the coefficient of thermal expansion of the substrate. While it is not required to make a precise match between the respective materials, selecting materials that are substantially similar, such as within $5\times10^{-6}$ unit length per ° C. (approximately $2.78\times10^{-6}$/° F.), may ensure that the coating remains intact for the intended duration.

Figure 3:
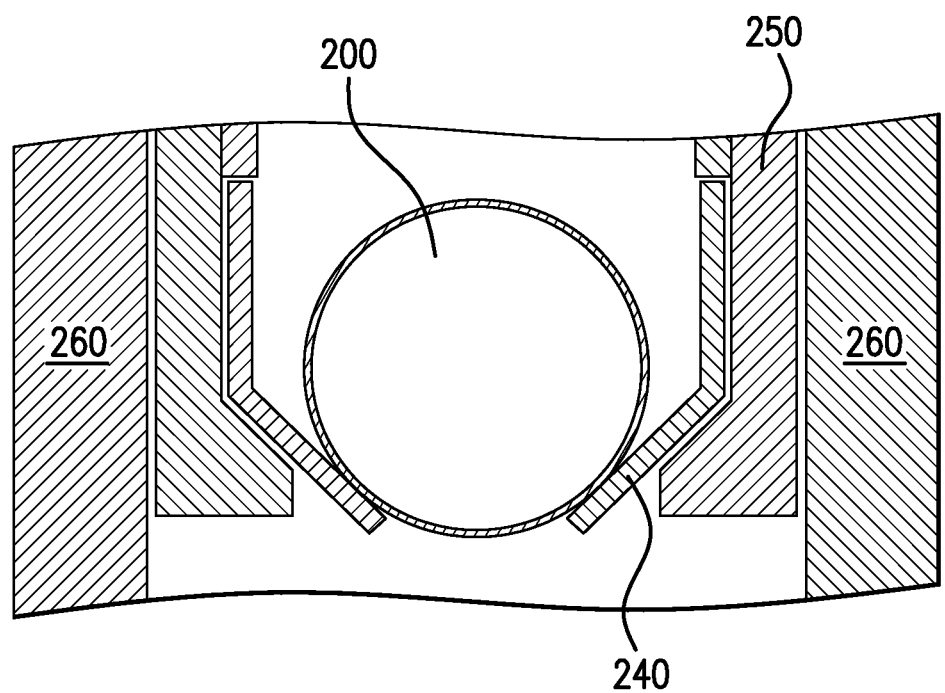
FIG. 3 is a sectioned side view depicting a ball and seat plug assembly according to another embodiment.

FIG. 3 depicts one embodiment of the present disclosure, employed with an apparatus for restricting fluid flow through a well conduit. In the illustrated example, a ball and seat assembly are deployed in the production tubing 260 of a well. The assembly comprises a housing 250 arranged in the production tubing 260, with a seat 240 arranged in a longitudinal bore of the housing 250. A ball 200 is illustrated in a position on the seat wherein the ball 200 restricts fluid flow through the longitudinal bore of the housing 250 and the production tubing 260. The features mentioned above are generic to most ball and seat assemblies. In this case any one or more of the ball 200, the seat 240, or the housing 250, may comprise a transitory substrate, which may be formed of a disintegrable material. Other examples of the ball and seat assembly may comprise any number of additional features, any one of which may also be formed with a transitory substrate.

A coating in accordance with the present disclosure may be applied to each of the features of FIG. 3 that include the transitory substrate. The resulting apparatus exhibits enhanced characteristics of erosion and corrosion resistance throughout the duration of the life of the coating. The intended duration of the life of the coating may be selected for a particular application and the composition and thickness of the coating chosen accordingly.

Upon the expiration of the coating, the ball 200, seat 240, and/or housing 250, comprising a transitory substrate may be disposed of in a selected timeframe according to the chosen substrate.

The chosen substrate may be any one of a number of materials that are currently available or which will become available that are appropriate for the desired purpose. The transitory substrate may comprise a disintegrable material that includes a disintegration agent activated by exposure to a particular fluid or pH. Examples of a suitable material include controlled electrolytic metallic (CEM) materials, a BHI proprietary material. These lightweight, high-strength and selectably and controllably degradable materials include fully-dense, sintered powder compacts formed from coated powder materials that include various lightweight particle cores and core materials having various single layer and multilayer nanoscale coatings. These powder compacts are made from coated metallic powders that include various electrochemically-active (e.g., having relatively higher standard oxidation potentials) lightweight, high-strength particle cores and core materials, such as electrochemically active metals, that are dispersed within a cellular nanomatrix formed from the various nanoscale metallic coating layers of metallic coating materials, and are particularly useful in borehole applications. Materials such as these may be paired with the erosion and corrosion resistant coating of the present disclosure to improve the performance of the material or tool.

The disclosure above describes exemplary embodiments of ball seats. Other embodiments may include any number of ball seats having multiple seat portions, flow paths, alignment planes, and shapes of plug members that are operative to direct objects to engage the seats. Further, although the term "ball" is used herein to refer to the seats disclosed herein, it is to be understood that the seats may be used in connection with another type of plug or plug member, such as a plug dart. All such configurations are deemed to be within the scope of the present disclosure and are deemed to be encompassed by the term "plug member."

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A coating for a transitory substrate having a transitory property defined by a selected rate of disintegration, comprising:
   a composite structure having a bonding component and one of an erosion resistant component and a corrosion resistant component, the composite structure having a proximal layer and a distal layer, the proximal layer being attached to the transitory substrate having the transitory property defined by the selected rate of disintegration, the proximal layer having a greater concentration of the bonding component when compared with the distal layer.

2. The coating of claim 1, the composite structure comprising a plurality of layers disposed between the proximal layer and the distal layer, each of the plurality of layers exhibiting a decrease in a ratio of the bonding component to the erosion or corrosion resistant component, when viewed from the proximal layer.

3. The coating of claim 1, the transitory substrate being formed of a disintegrable material.

4. The coating of claim 3, the transitory substrate being formed from a material comprising controlled electrolytic metallic materials.

5. The coating of claim 1, the bonding component including one or more of cobalt, cobalt alloys, chromium, chromium alloys, copper, copper alloys, iron, iron alloys, nickel, and nickel alloys.

6. The coating of claim 1, the erosion or corrosion resistant component comprising one or more of a carbide, a nitride, an oxide, a ceramic, and an intermetallic.

7. The coating of claim 1, the composite structure having a thickness that is between about 0.0005 to about 0.10 inches.

8. The coating of claim 1, configured to fail after a selected duration.

9. The coating of claim 1, a ratio of the bonding component to the erosion and/or corrosion resistant component at the proximal layer being between about 90/10 and about 50/50.

10. A disposable tool, comprising:
a transitory substrate having a transitory property defined by a selected rate of disintegration; and
a coating disposed on an outer surface of the transitory substrate, the coating comprising a gradient composite structure, having a bonding component with a greater concentration at a proximal layer, and
a composite structure having a bonding component and one of an erosion resistant component and a corrosion resistant component, the composite structure having a proximal layer and a distal layer, the proximal layer being attached to the transitory substrate having the transitory property defined by the selected rate of disintegration, the composite structure having a ratio of the bonding component to the erosion or corrosion resistant component at the proximal layer that is greater than a ratio of the bonding component to the erosion or corrosion-resistant component at the distal layer.

11. The tool of claim 10, the transitory substrate being formed from a material comprising controlled electrolytic metallic materials.

12. The tool of claim 10, the coating being disposed onto the outer surface of the transitory substrate by physical vapor deposition, chemical vapor deposition, plasma-enhanced chemical vapor deposition, thermal spray, cold spray, or laser deposition.

13. The tool of claim 10, the bonding component having a coefficient of thermal expansion that substantially matches a coefficient of thermal expansion of the transitory substrate.

14. The tool of claim 10, the transitory substrate comprising a plug, plug seat, disk, dart, sleeve or tubular section.

15. The tool of claim 10, the transitory substrate and coating configured to form at least a part of an apparatus for restricting flow through a well conduit.

16. An apparatus for restricting flow through a well conduit, comprising:
a housing having a longitudinal bore and a seat disposed within the bore; and
a plug member configured to be disposed into the bore and landed on the seat to restrict fluid flow through the bore, wherein at least one of the seat and the plug member being formed of a transitory material having a transitory property defined by a selected rate of disintegration and having a protective coating applied thereon, wherein the protective coating comprises a gradient composite structure having a bonding component and an erosion or corrosion resistant component, the gradient composite structure comprises a proximal layer being attached to the at least one of the seat and the plug member, the proximal layer having a greater concentration of the bonding component when compared with a distal layer of the gradient composite structure.

17. The apparatus of claim 16, the bonding component including one or more of cobalt, cobalt alloys, chromium, chromium alloys, copper, copper alloys, nickel, and nickel alloys.

18. The apparatus of claim 16, the erosion or corrosion resistant component comprising one or more of a carbide, a nitride, an oxide, a ceramic, and an intermetallic.

19. The apparatus of claim 16, the transitory material comprising controlled electrolytic metallic materials.

20. The apparatus of claim 16, the protective coating and the transitory material configured to disintegrate each within a selected timeframe.

21. A seat assembly located in a well bore, comprising a seat element having a substrate formed at least partially from a transitory material having a transitory property defined by a selected rate of disintegration and disposed in a well bore, the seat element being configured to receive a plug element, the seat element and the plug element restricting flow through the well bore when the plug is received by the seat element, wherein the disintegrable material includes an outer layer comprising a gradient composite material formed at least partially from a bonding material provided in a greater concentration at an inner surface attached to the substrate than at an outer surface of the outer layer.

22. The seat assembly of claim 21, wherein the transitory material comprises controlled electrolytic metallic.

23. The seat assembly of claim 21, wherein the outer layer is deposed on the substrate.

24. The seat assembly of claim 23, the outer layer formed at least partially from one of an erosion resistant material and a corrosion resistant material.

* * * * *